Patented Oct. 31, 1944

2,361,367

UNITED STATES PATENT OFFICE 2,361,367

METHOD OF REMOVING ACETYLENE POLYMERS FROM CRUDE ACRYLONITRILE

Harold S. Davis, Greenwich, and Herbert A. Newey, Stamford, Conn., assignors to American Cyanamid Company, New York, N. Y., a corporation of Maine No Drawing. Application December 1, 1942, Serial No. 467,558

6 Claims. (Cl. 260—464)

The present invention relates to the refining of crude acrylonitrile, and more specifically to a method of removing acetylene polymers therefrom.

Crude acrylonitrile as now produced may contain impurities of the acetylene polymer type, such as for example, divinylacetylene and its isomer, ethinyl butadiene, which have boiling points close to that of pure acrylonitrile. Consequently, removal of these impurities by fractional distillation is extremely difficult.

It is highly important that these impurities be removed as they promote instability and cause polymerization of the acrylonitrile. Their presence in the nitrile can be readily detected by an increase in the refractive index and a lowering of the density.

Divinylacetylene has a boiling point of 83.5° C. at 760 mm., a refractive index of 1.5047 and a density of 0.7759 at 20° C. The physical constants of ethinyl butadiene are substantially the same as those of divinylacetylene. Acrylonitrile has a boiling point of 77.5° C. at 760 mm., a refractive index of 1.3915 and a density of 0.8062 at 20° C.

We have discovered a simple and convenient method of removing impurities of the above type from crude acrylonitrile which takes advantage of the preferential affinity of sulfuric acid for acetylene polymers as against acrylonitrile. This novel method consists in treating the crude acrylonitrile with sulfuric acid, the latter rapidly and selectively reacting with the acetylene polymers. Following the acid treatment, the reaction mixture is neutralized with ammonia. The acrylonitrile is then separated from the precipitated solids by decantation or filtration, and distilled to obtain the pure product.

Bases other than ammonia can be used to neutralize the reaction mixture. When the neutralization agent is added in aqueous solution, the reaction mixture stratifies into two layers, an aqueous layer and the acrylonitrile layer, the latter being removed by decantation and fractionally distilled.

The principal variables in the sulfuric acid treatment of the crude acrylonitrile are: relative amount and concentration of acid, temperature, and contact time. The refining power of the acid rapidly increases with increasing concentration up to 100%. A concentration greater than 100% is unsatisfactory in that the acid reacts rapidly with the acrylonitrile. Higher temperatures and longer contact time are required with a more dilute acid. Temperatures above 50° C. are not recommended as again the nitrile is too readily attacked by the acid.

The amount of acetylene polymers found in crude acrylonitrile rarely exceeds 10%, and usually is of the order of 2% or less. When treating a crude acrylonitrile containing a considerable quantity of the impurities, the sulfuric acid should be added very slowly with good agitation to avoid excessive heating.

The invention will be illustrated in greater detail by the following examples:

Example 1

The quantity of sulfuric acid required to react with the divinylacetylene in 100 ml. of a crude dry acrylonitrile (refractive index of 1.3912 at 25° C.) containing approximately 1.7% by weight of the acetylene polymer was calculated to be 2 ml. of 100% acid. This quantity was added slowly with stirring to the crude acrylonitrile at room temperature. After standing one hour, the dark-colored mixture was neutralized by passing in ammonia gas. The precipitated material was removed by filtration. The filtrate was then refluxed to remove excess ammonia and distilled to yield acrylonitrile having a boiling point of 77.5° C. at 760 mm. and a refractive index of 1.3892 at 25° C.

Example 2

100 ml. of dry crude acrylonitrile (refractive index of 1.3912 at 25° C.) containing approximately 1.7% by weight of divinylacetylene were heated to 45° C. in a 3-neck reaction vessel fitted with a thermometer, stirrer, and a condenser. 2 ml. of 100% sulfuric acid were added slowly with stirring. The reaction mixture was allowed to stand for one-half hour at a temperature of 40°–45° C., then cooled, neutralized with ammonia and filtered to remove the precipitated material. The filtrate was refluxed to remove excess ammonia and distilled. The distillate had a boiling point of 77.5° C. and a refractive index of 1.3892 at 25° C. which indicated that the divinylacetylene had been completely removed.

Example 3

200 ml. of crude acrylonitrile (refractive index of 1.3965 at 25° C.) containing approximately 6.4% of acetylene polymers were stirred and heated at 30°–35° C. in a reaction vessel of the type used in Example 2. 26 ml. of 100% sulfuric acid were added over a period of one hour. The reaction mixture darkened and a portion of the sulfuric acid-acetylene polymer product separated out as a viscous tar-like material. After standing one hour at about 35° C., the mixture was cooled and neutralized with ammonium hydroxide solution. Two layers formed, one consisting of the acrylonitrile and the other an aqueous layer. The acrylonitrile was decanted off and fractionally distilled to yield a product having a refractive index of 1.3893 at 25° C.

The method herein described is of particular utility in that it provides a marketable product of high purity.

While the invention has been described with particular reference to specific embodiments, it is to be understood that it is not to be limited thereto, but is to be construed broadly and restricted solely by the scope of the appended claims.

What is claimed is:

1. The method of removing acetylene polymer impurities from crude acrylonitrile which comprises treating a crude acrylonitrile containing those impurities with sulfuric acid, separating and recovering the acrylonitrile therefrom.

2. The method of removing acetylene polymer impurities from crude acrylonitrile which comprises treating a crude acrylonitrile containing those impurities with a quantity of sulfuric acid sufficient to react with the acetylene polymer impurities and insufficient to react with any substantial quantity of the acrylonitrile, separating and recovering the acrylonitrile therefrom.

3. The method of removing acetylene polymer impurities from crude acrylonitrile which comprises bringing together quantities of sulfuric acid and a crude acrylonitrile containing those impurities, neutralizing the resulting mixture, separating and recovering the acrylonitrile therefrom.

4. The method of claim 3 further characterized in that the concentration of the sulfuric acid is approximately 100%.

5. The method of claim 3 further characterized in that the crude acrylonitrile and sulfuric acid are brought together at a temperature not exceeding about 50° C.

6. The method of removing divinylacetylene from crude acrylonitrile which comprises bringing together quantities of sulfuric acid of approximately 100% concentration and a crude acrylonitrile containing divinylacetylene at a temperature not exceeding about 50° C., neutralizing the resulting mixture, separating and recovering the acrylonitrile therefrom.

HAROLD S. DAVIS.
HERBERT A. NEWEY.